United States Patent [19]

Klos-hein

[11] Patent Number: 4,722,011
[45] Date of Patent: Jan. 26, 1988

[54] CASSETTE LOADING/EJECTION AND LIFT MECHANISM

[75] Inventor: Karl Klos-hein, Ruttershausen, Fed. Rep. of Germany

[73] Assignee: U.S. Philips Corporation, New York, N.Y.

[21] Appl. No.: 917,263

[22] Filed: Oct. 8, 1986

Related U.S. Application Data

[63] Continuation of Ser. No. 749,148, Jun. 26, 1985, abandoned.

[30] Foreign Application Priority Data

Jun. 30, 1984 [DE] Fed. Rep. of Germany ....... 3424234

[51] Int. Cl.$^4$ .................. G11B 15/00; G11B 17/00
[52] U.S. Cl. ................................. 360/93; 360/71; 360/96.5
[58] Field of Search ............ 360/93, 96.1, 96.2, 360/96.5, 71

[56] References Cited

U.S. PATENT DOCUMENTS 4,573,088 2/1986 Kommoss ........................ 360/71
4,586,096 4/1986 Okada ........................... 360/93 X
4,586,098 4/1986 Okada ........................... 360/93 X Primary Examiner—John H. Wolff
Attorney, Agent, or Firm—David R. Treacy

[57] ABSTRACT

A loading/ejection lever has a slot engaged by a pin on a servo member, for pivoting the lever during loading or ejection of a cassette. The servo member also has a guide surface for causing a cassette lift to be lowered during the latter stages of insertion, and raised during the first stages of cassette ejection. The guide surface for the cassette lift is divided into separate lowering and raising portions, arranged so that a longer stroke of the servo member is utilized during the loading process, before the cassette lift is lowered, than in the reverse movement in which the lift is raised only after the servo member has passed the lowering point. As a result of this construction, it is possible to provide a greater distance between the lever pivot and the location where the coupling pin on the servo member engages the lever, and to provide a spring element on the lever which biases the coupling pin during only a portion of the range of engagement between the servo member and the loading/ejection lever.

10 Claims, 4 Drawing Figures

CASSETTE LOADING/EJECTION AND LIFT MECHANISM

This is a continuation of application Ser. No. 749,148, filed June 26, 1985, now abandoned.

BACKGROUND OF THE INVENTION

The invention relates to a control device or mechanism for a magnetic-tape-cassette apparatus comprising (a) a servo member which is movable rectilinearly between a first end position, in which a cassette is ejected, and a second end position, in which the cassette is drawn in and lowered, (b) a loading/ejection lever which is pivotable about a pivot by the servo member, and which is pivotable against spring force at least during a part of its pivotal movement, (c) a cassette lift which can be lowered and raised via a lowering and lifting path on a guide surface of the servo member, (d) a pin on the servo member, for guiding the loading/ejection lever via a slot in this lever, and (e) a guide element on the cassette lift, which element cooperates with the guide surface.

Such a control device is known from EP-A No. 95 815 to which U.S. Pat. No. 4,573,088 corresponds. In magnetic-tape-cassette equipment used in conjunction with car radios it is important that the travel of the servo rod is minimized. In order to obtain a maximum pivotal displacement of the loading and ejection lever in spite of this short travel of the servo rod, the pivot of the loading and ejection lever and a coupling pin by which the lever is pivoted are arranged as close as possible to each other. However, this leads to a very large transmission ratio, so that displacement of the servo rod results in a substantial load being exerted on the part supporting the relevant pivot. If the supporting part is made of a plastic material, this may lead to deformation when the load is sustained for a long time. In a car this is even more likely to happen because of the high temperatures which may occur in warmer seasons. In such equipment it is also customary to use springs in order to pull the lever into the ejection position. If the apparatus contains a cassette, these springs are constantly tensioned, so that the springs constantly exert a load on the supporting part.

The guide surfaces, which are generally used for the cassette lift, lower and raise the lift in practically the same position of the servo rod. In this way the movements during loading and ejection cannot be influenced.

SUMMARY OF THE INVENTION

The object of the invention is to provide a control device for a cassette insertion mechanism of the type described above in which the load exerted on the pivot of the loading and ejection lever is minimized because the distance between the pivot and the pin on the servo rod is increased; and the time during which the springload is exerted is limited, although the total travel of the servo rod is not significantly increased.

In accordance with the invention the loading/ejection lever carries a spring element which influences the pin only along an initial portion of the guide surface. Two guide surfaces are provided for controlling the lift movements, and are arranged in such a way that, at the end of the loading movement of the lever, the guide element of the lift is first forced to co-operate with the first guide surface; and subsequently, at the beginning of the ejection movement, the guide element changes over to the second guide surface which is followed in the opposite direction. These guide surfaces each comprise lowering and raising portions, the lowering portion of the first guide surface having a larger distance from the first end position than the point of the raising portion of the second guide surface where raising begins.

In this way it is possible to increase the distance between the pin on the servo rod and the pivot of the loading and ejection lever without changing the travel of the servo rod. Since the first guide surface is longer, the length of the loading path becomes larger than that of the ejection path, the ejection movement being controlled by means of the shorter guide surface. Although the length of the loading path is increased, the point where ejection begins is situated at a location beyond which all control functions of the servo rod are still possible. In spite of the larger distance between the pivot and the pin the servo rod can perform all the required movement functions within the servo-rod travel which is limited by the housing.

Since the spring element influences the pin only along an initial part of the guide slot in the loading and ejection lever, it operates only when required; that is, during the change from manual insertion to motor-driven loading. When the cassette is inserted fully, the pivot of the loading and ejection lever is no longer loaded, because the spring element no longer exerts a spring load on the loading and ejection lever. In this way, the load on the pivot is minimized, allowing the spindle constituting the pivot to be made of a plastic material.

Perferably the guide element is spring-loaded perpendicularly to the direction of movement of the servo rod from one guide surface to the other guide surface. This ensures that the guide element is always forced to change over from one guide surface to the other guide surface.

In the preferred embodiment both guide surfaces are formed on an elongate molded member, the end surface of the first guide surface in the lowering path having inclined portions via which the guide element is forced to change over to the second guide surface when the servo rod returns from the second end position to the first end position. In this way the guide surfaces may simply be injection-molded or die-cast together. This construction enables the transition between the two guide surfaces to be made without any problem.

Also, in the preferred embodiment of the invention, the guide element is a roller which under the influence of a spring is axially movable on a spindle secured to the lift. Such a roller operates very smoothly and reliably even after a long period of operation.

An embodiment of the invention will be described in more detail, by way of example, with reference to the accompanying drawings.

Figure 1:
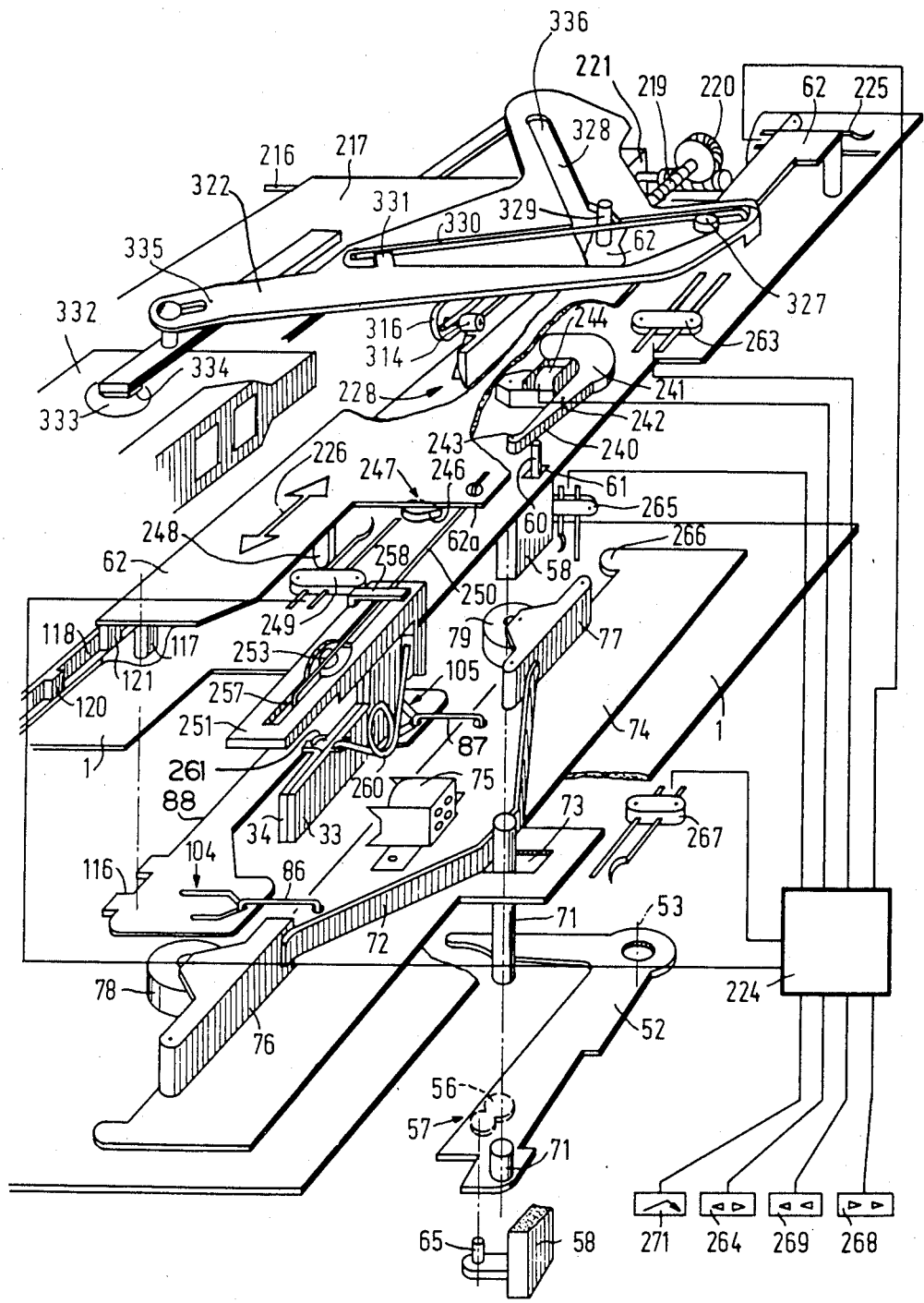
FIG. 1 is an exploded view schematically showing a loading/injection mechanism and control device in accordance with the invention.

The servo mechanism shown in FIG. 1 comprises a servo member, which is movable in the deck plate adjacent a cassette lift 217 in a longitudinal direction the same as the loading and ejection direction of a cassette 332. The servo rod 62 is moved by means of a threaded spindle 219. This threaded spindle is driven via a worm gear 220 by a reversible servo motor 221, which is controlled by a control circuit 224 of the microprocessor type. A switch 225 on the deck plate 1 limits the travel of the servo member 62 in one direction. The switch 225 marks the end position of the servo member 62 in the direction of a double arrow 226 for the microprocessor 224, to which position all servo-rod movements are referred.

Figure 2:
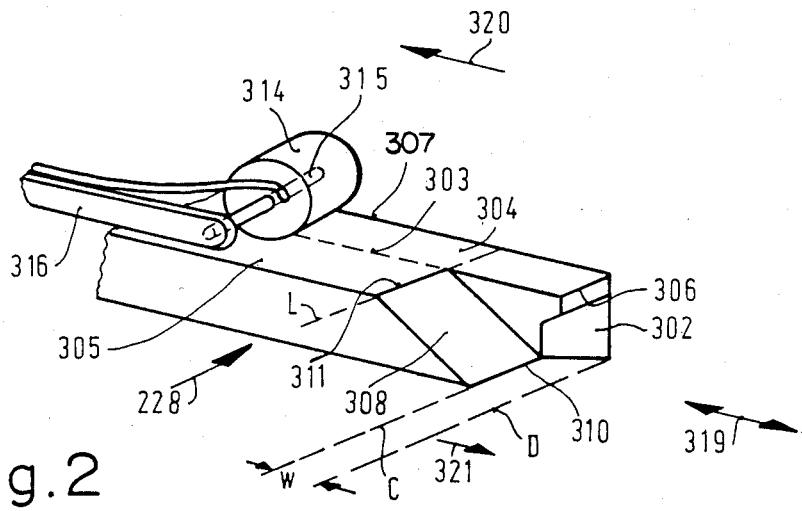
FIG. 2 is an elevation and FIG. 3 is a plan view showing a double guide-surface member which cooperates with a roller of the cassette lift and which is constructed so as to obtain loading and ejection paths of different lengths.

The lift 217 is pivotable about a spindle 216 and its vertical movement is guided by means of a roller 314 which co-operates with a double guide member 228 of the servo member 62. The member 228 is shown in FIG. 2. It consists of a die-cast or injection-molded member which as shown in FIG. 1 extends from the rear in a forward direction and terminates in a free front portion 302. The member 228 comprises two guide surfaces 304 and 305 which are theoretically separated by the broken line 303. The guide surface 304 terminates in a vertical edge 306. The edge 306 extends substantially perpendicularly to a side wall 307 of the member 228.

The guide surface 305 has an inclined surface 308. This surface 308 begins at the edge 310, which recedes relative to the edge 306 over a length w. From the edge 310 the inclined surface extends upwards and terminates at the edge 311 where the horizontal portion of the guide surface 305 begins.

A guide element in the form of a roller 314 can co-operate with the double guide member 228. This roller 314 is axially movable on a spindle 315. The spindle 315 is secured to a portion 316 of the lift. A blade spring or wire spring 317 urges the roller 314 on the spindle 315 away from the portion 316 against a stop washer 318.

The guide member 228, which is secured to the servo member 62, moves to and fro in the directions indicated by the double arrow 319 to perform specific control functions. The guide-surface system shown in FIGS. 2 and 3 serves only for raising and lifting the lift, and thus the cassette, into and out of the playing position. It is assumed that the servo member moves in the direction indicated by the arrow 320. The roller 314 then follows the guide surface 304 and leaves this surface at the end 306. The lift is now lowered and playing of the cassette may begin. If the cassette must be raised out of the playing position, the servo rod is moved to the right in the direction indicated by the arrow 321. The roller 314 is now urged towards the guide surface 305 by the oblique surface 302 and rolls up the inclined surface 308, which upward movement of the roller 314 causes the lift to be raised. The path of movement of the roller 314 from the guide surface 304 to the guide surface 305 is indicated by the dashed arrows in FIG. 3.

Figure 3:
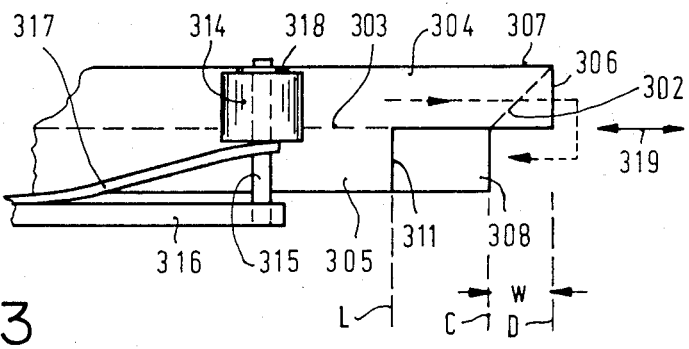
Figure 4:
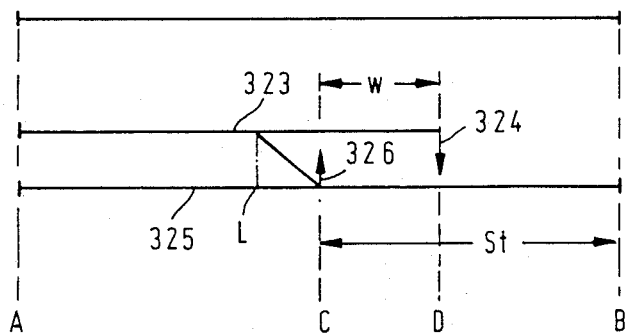
FIG. 4 is a diagram illustrating that the lift is lowered and raised during different stages of the servo member movement.

FIG. 4 is a diagram serving to explain the purpose of the different guide-surface shapes. The servo member 62 is movable between a first end position A and a second end position B. During this movement the cassette loading and ejection operations and the control operations of the servo mechanism are performed. Between points A and B a point C is situated which marks a division into a path of movement between A and D, during which loading is effected, and into a path St between C and B, in which control operations are effected. As a result of the construction of a pivotal loading/ejection lever 322, which will be described hereinafter and which has a pivot 327 whose distance from a pin 329 on the servo member 62 is large, a larger path length is necessary for the loading movement. This is possible by means of the double guide member 228, which ensures that the lift is lowered to the level 325 at point D. After this, the control operations are performed. Raising of the lift begins in point C. For a better understanding the points C and D are indicated in FIGS. 2 and 3. The path 323 in FIG. 4 is the loading path for the loading/ejection lever 322. FIG. 4 shows that the path 323 ends at a location indicated by the arrow 324 within the control range St for the servo rod. Point C, where raising begins, is shifted relative to point D. Raising stops at a point L, where the roller 314 has reached the horizontal portion of the guide surface 305. A raising arrow 326 indicates the hysteresis path, which begins at a distance w from the lowering arrow 324.

In FIG. 1 the double guide member 228 and the roller 314 are shown only schematically. The pivotal lever 322 is pivotable about a pivot in the form of a spindle 327. The loading/ejection lever 322 has a guide slot 328 in which the pin 329 of the servo member 62 engages. The pin 329 can move in the slot and thereby pivot the pivotal lever 322. A straight wire spring 330 extends transversely of the slot 328 and is fastened at its ends 331.

By means of the cassette lift 217 a cassette 332 can be moved inwards. The cassette 332 has a winding-spindle hole 333, which is engaged by an element 334. The element 334 is mounted for rotation on an arm 335 of the pivotal lever 322.

In the position shown in FIG. 1 the element 334 has engaged the winding-spindle hole 333 of the manually inserted cassette. In this position the cassette 322 projects about 30 mm from the apparatus. As the cassette is inserted further, the spring 330 is tensioned. The pivotal lever 322 now closes a switch 263, and the servo rod is moved from the first end A (FIG. 4) in a manner to be described hereinafter by means of the drive motor 221 which is now started. The pin 329 now moves in the slot 328 towards the end 336 of the slot and thereby releases the spring 330. The spring 330 is now relaxed and exertes no load on the pivotal lever 322. Consequently, no lateral load is exerted on the spindle 327. If for an ejection movement the servo member 62 is moved towards point A (FIG. 4) via point C, the pin 329 re-engages the slot 328 and presses against the spring 330, which subsequently, after the motor 221 has been switched off by the switch 263, pivots the lever 322 so far counterclockwise that the cassette is moved outwards until the spring 330 has relaxed.

The pin 60 of the latching lever 58 extends through the hole 61 in the deck plate 1 and abuts against an edge 240 of the latching lever 241. The latching lever 241 is pivotable about a pivot 242. The lever 58 tends to pivot the latching lever 241 away from a latching magnet 244. A nose 243 on the lever 241 can co-operate with a guide surface 246 on the servo member 62. The latching magnet 244 is electrically connected to the control circuit 224.

The guide surface 246 forms part of a nose 247 which is molded on the servo member 62. When the servo member 62 is moved, the guide surface 246 on the nose 243 can cooperate with the lever 241 and thereby move this lever in such a way that it is applied to the latching magnet 244. An adjustable projection 248 simultaneously engages a play and reverse switch 249. As the projection 248 moves along the switch 249 this normally closed switch is briefly opened and is then closed again.

Near an end 62a of the servo member 62 this rod cooperates with a command element in the form of a connecting rod 250. The connecting rod is bent and hooked into a hole in the servo member 62. The connecting rod 250 extends up to a command block 251 which has a multi-part connecting path including a closed guide path 253, which is always followed in the same direction, formed in the block. A bent end portion of the connecting rod 250 forms a command pin 257 which is movable in these paths. Portions of the multi-part path are formed by parallel through-going slots which are engagable from the top by the command pin 257 and from the bottom by actuating portions of the actuating rods 33 and 34. By means of a hold-down member 258 the command pin 257 is elastically urged into the paths. The guide path 253 is formed by a recess in the command block 251, which recess surrounds a center portion. The bottom of the guide path 253 has portions which ensure that the command pin 257 can only follow the guide path 253 in the clockwise direction. Springs 260 and 261 ensure that after release by the command pin 257 the actuating rods 33 and 34 are always pressed to the left.

The device operates as follows. When a cassette is inserted about 10 mm further inwards from the position in which the element 333 has engaged the winding-spindle hole, the pivotal lever 322 closes the switch 263. The motor 221 is then started and the microprocessor 224 is electrically connected. The servo member 62 is moved to the right, as seen in FIG. 1, and moves further to the right up to the reset switch 225. During this movement of the servo member the lift 217 is lowered via the guide surfaces 304, 306 (FIGS. 2 and 3). Closure of the reset switch 225 results in the microprocessor 224 being reset to an initial state. The direction of rotation of the servo motor 221 is then reversed and the servo member 62 is moved to the left. The projection 248 then moves along the play/reverse switch 249, which is opened and switches off the servo motor, so that the servo member stops. The tape-deck motor (not shown) is now started. The guide surface 246 has abutted against the nose 243, but the latching lever 241 is not applied to the latching magnet 244 because this magnet is not energized by the circuit 224. Therefore, the pin 65 has not engaged the latching mechanism 57 and is not latched.

Since the tape-deck motor has started, portions of the tape drive mechanism (not shown) are set in motion. For full disclosure of an exemplary mechanism, and more detail of some of the subassemblies shown in FIG. 1, reference is made to U.S. Pat. Nos. 4,573,088 and 4,611,254. At the same time it can co-operate with the heart-shaped projection 56.

Prior to initiation of tape transport, the connecting member 52 is pivoted clockwise about a pivot 53, as viewed in FIG. 1. Since the latching lever 58 has pivoted and the pin 65 is positioned in the area of engagement with the heart-shaped projection 56, the pin 65 now travels along the wall of the heart-shaped projection 56 and engages the recess in that projection. Thus, the connecting member is latched in a pivotal position.

As a result of the pivotal movement of the connecting member 52, the limb 71 extending from the member 52 has moved inwards along the slot 73 in the head-mounting plate 74 and is urged against the blade spring 72. The blade spring in its turn presses against the head-mounting plate 74 on which a sound head 75 is mounted, via the members 76 and 77 and tends to urge this plate towards the capstans (not shown). Now the action of the control plate 88 manifests itself.

A stop 116 on the control plate 88 can be engaged by a projection 117 on an intermediate slide 118 which is movable parallel to the arrow 226. The slide 118 has a stop 120 which engages an actuating portion 121 of the servo member 62, for moving the control plate 88 in response to certain movements of the servo member 62.

Prior to the pivotal movement of the limb 71 the head-mounting plate 74 had moved away from the capstans. When the head-mounting plate 74 is moved towards the capstans the guide pins 86, 87 move forwards and run into the right-hand branches of the fork-shaped guide slots 104, 105. The right-hand guide pin 87 is then retained in the shorter branch and the left-hand guide pin 86 can move freely towards the capstan. As a result of this, the advanced head-mounting plate 74 swings forwards to the left, in such a way that the left-hand pressure roller 78 is applied to its capstan. The other capstan remains free. The head-mounting plate 74 very briefly occupies this position.

As the pin 65 is not latched by the latching mechanism 57 the head-mounting plate is moved under the influence of the blade spring 72, and returns to its initial position. This causes a switch 267 to be changed over, so that the tape-deck motor is switched off. This operation proceeds so fast that it is not noticed by the user. This is necessary because the movement of the control plate 88 would result in the position for reverse play. However, upon insertion of a cassette the deck should first be set to forward play. By means of the microprocessor 224 this is achieved in that the servo motor 221 is started again and moves the servo member 62 to the right up to the reset switch 225, after which it is again moved to the left until the latching lever 241 is drawn against the latching magnet 244. Since the magnet 244 is now energized, the lever 241 remains in this position, so that the pin 65 can be latched by the latching mechanism 57. The reverse play switch 249 is again opened by the projection 248, the servo member 62 stops and the tape-deck motor is started again.

When the tape-deck motor is started again the control plate 88 is shifted. During the outward movement of the head mounting plate 74 the guide pins 86, 87 have moved out of the right branches. The control plate remains in its previous position. When the motor is started again the connecting member 52 is pivoted and the head-mounting plate 74 is thus moved forwards by means of the limb pin 71.

The control plate 88 is now shifted so that, when the head-mounting plate 74 is moved towards the capstans, the guide pins 86, 87 move forwards and move into the left-hand branches of the fork-shaped guide slots 104, 105. When the guide pins 86, 87 enter these branches, the left-hand guide pin 86 is then retained in the shorter branch and the right-hand guide pin 87 can move freely towards the capstan. The advanced head-mounting plate 74 then swings forwards to the right, so that the right-hand pressure roller 79 is applied to the right-hand capstan. The other capstan remains free. The tape now runs in the forward play direction.

It is to be noted that there is provided a track switch 265 which supplies an indication about the direction of tape transport to the microprocessor 224. The track switch 265 is actuated by a nose 266 on the head-mounting plate 74. The switch 265 ensures the magnetic head 75 is switched to the correct tracks depending on the direction of tape transport. Reversing is readily possible by manual actuation in the normal play mode. For this purpose the locking magnet 244 is de-energized by briefly pressing the button 264. The pin 60 is tilted to the left in the situation shown in FIG. 1. The latching mechanism 57 is then released and the pin 65 is moved away from this mechanism. This enables the head-mounting plate 74 to be withdrawn. As a result of the change-over of the switch 67 the tape-deck motor now stops until the servo motor 221 has moved the servo member 62 against the switch 225 and has returned it to the play position, the switch 249 being opened again by the projection 248. During this movement the guide surface 246 has again positioned the locking lever 241 against the locking magnet 244. The latching mechanism 57 is again actuated by the engagement of the pin 65. The control circuit 224 now starts the tape-deck motor again. The connecting member 52 is also pivoted and the head-mounting plate 74 is advanced. The tape-transport direction is reversed by means of the control plate 88, as shown in FIGS. 5 and 6.

Depending on the direction, one of the fast-wind touch controls 268, 269 which are electrically connected to the control circuit, is actuated for fast winding. Thus, the locking magnet 244 remains de-energized via the control circuit 224.

In the play position the command pin 257 is situated in the starting portion of the closed guide path 253. The command pin 257 has a certain tolerance in this starting portion. This tolerance can be adjusted by means of an adjusting block, not shown, by means of which the projection 248 is adjusted. In this way the instant at which the switch 249 is closed can be adjusted. It is assumed that normal forward playing is effected in the range of change-over to fast winding. If the fast-wind touch control 268 is now touched, the control circuit 224 controls the servo motor 221 in such a way that the servo member 62 is moved to the right (FIG. 1). The command pin 257 now enters a first command path. The pin then moves the actuating portion of the actuating rod 33 to the right. At the same time the drive gear wheels are set to a position in which the tape is wound rapidly in the forward direction. The head-mounting plate 74 is then withdrawn from the tape. However, the travel of the plate 74 is shortened, so that the switch 267 is not actuated. Fast forward winding can be stopped by touching the play touch control 264. The servo member 62 is moved back into the play position and the command pin 257 reaches the starting portion again. The spring 260 moves the actuating rod 33 to the left. The tape is now again played in the direction in which it was played before fast winding.

If fast reverse winding is required, the fast-wind touch control 269 should be touched. The control circuit 224 then supplies a command to the servo motor 221 to move the servo member 62 to the left. The command pin 257 enters the guide path 253 again. At this instant the switch 249 is closed, which means that the servo motor 221 is reversed by means of the control circuit 224. The command pin 257 is now forced to continue in the same direction in the guide path 253, enters a command path and moves the actuating rod 34 to the right. The individual tape drive parts are now set to their positions for fast reverse winding and the head-mounting plate is withdrawn from the tape. Fast reverse winding can be discontinued by touching the play touch control 264. The servo member 62 moves back and the command pin 257 runs into the guide path 253 until it reaches the starting portion. Under the influence of the spring 261 the actuating rod 34 has followed the command pin 257 and has returned to the initial position. Playing is now continued in the original playing direction.

When an electrical ejection touch control 271 is touched the latching magnet 244 is de-energized and the latching lever 241 is released. The head-mounting plate 74 is then withdrawn from the tape; the switch 267 is closed, and the tape-deck motor is switched off. This ensures that the head is lifted off the tape and neither the tape nor the head can be damaged. The servo motor moves the servo member 62 fully to the left. The command pin 257 then enters a third command path. After raising of the lift 217 the cassette 332 is thus slid outwards and the switch 263 is opened.

What is claimed is:

1. A control device for a cassette loading/ejection and lift mechanism in a magnetic-tape-cassette apparatus, comprising
   a servo member which has a guide surface and which is movable rectilinearly between a first end position, in which a cassette loaded in the apparatus is ejected, and a second end position, in which the cassette is drawn in and lowered,
   a loading/ejection lever having an elongated slot formed therein,
   means for pivoting said lever in response to movement of said servo member, and for providing a spring force opposing pivoting of the lever at least during a part of the lever pivotable movement,
   a cassette lift which can be lowered and raised via a lowering and lifting path on said guide surface,
   a connecting element on said servo member for guiding the loading/ejection lever via said slot, and
   a guide element on the cassette lift, arranged to engage said guide surface,
   characterized in that said means for pivoting comprises a spring element arranged such that said spring element engages said connecting element only during engagement of said cassette lift with an initial portion of said guide surface while said servo member is at and is adjacent said first end position, said guide surface further comprising a first guide surface having a lowering portion, and a second guide surface having a raising portion for raising the lift, the lowering portion of the first guide surface being arranged at a greater distance from the initial portion than the location on the raising portion of the second guide surface where raising of the lift begins, and
   means for causing said guide element to cooperate with said first guide surface during loading movement of said lever, and until said lift is lowered; and at the beginning of movement of the servo member from the second end position, for causing said guide element to cooperate with said second guide surface until said lift is raised.

2. A control device as claimed in claim 1 characterized in that the guide element is spring-loaded perpendicularly to the direction of movement of the servo member from one guide surface to the other guide surface.

3. A control device as claimed in claim 2, characterized in that the guide element is a roller which under the influence of a spring is axially movable on a spindle secured to the lift.

4. A control device as claimed in claim 2, characterized in that both guide surfaces are formed on an elongate molded member, the end surface of the first guide surface in the lowering path having inclined portions via which the guide element is forced to change over to the second guide surface when the servo member returns from the second end position to the first end position.

5. A control device as claimed in claim 4, characterized in that the guide element is a roller which under the influence of a spring is axially movable on a spindle secured to the lift.

6. A control device as claimed in claim 1, characterized in that the spring element is a resilient rod which is fastened transversely of the guide slot.

7. A control device as claimed in claim 1, characterized in that the guide element is a roller which under the influence of a spring is axially movable on a spindle secured to the lift.

8. A device as claimed in claim 1, characterized in that said spring element is a straight spring mounted to said lever, extending transversely of the elongation direction of said slot for engaging said connecting element for a portion only of its movement along said slot.

9. A control device for a cassette loading/ejection mechanism in a magnetic-tape-cassette apparatus, comprising
a servo member which is movable rectilinearly between a first end position, in which a cassette loaded in the apparatus is ejected, and a second end position, in which the cassette is drawn in,
a loading/ejection lever having an elongated slot formed therein,
means for pivoting said lever in response to movement of said servo member, and for providing a spring force opposing pivoting of the lever at least during a part of the lever pivotable movement, and
a connecting element on said servo member for guiding the loading/ejection lever via said slot,
characterized in that said lever carries a spring element, and
the device comprises means for causing engagement of said spring element with said connecting element only during the insertion/ejection movement of said lever, said connecting element being free of said spring element prior to and after the completion of insertion of a cassette.

10. A device as claimed in claim 9, characterized in that said spring element is a straight spring mounted to said lever, extending transversely of the elongation direction of said slot for engaging said connecting element for a portion only of its movement along said slot.

* * * * *